(12) United States Patent
Laury

(10) Patent No.: US 12,010,491 B2
(45) Date of Patent: Jun. 11, 2024

(54) METHOD FOR PROCESSING A SIGNAL FROM AN ACOUSTIC EMISSION SYSTEM OF A VEHICLE AND VEHICLE COMPRISING THIS ACOUSTIC EMISSION SYSTEM

(71) Applicant: Faurecia Clarion Electronics Europe, Paris (FR)

(72) Inventor: Cyril Laury, Antony (FR)

(73) Assignee: Faurecia Clarion Electronics Europe, Paris (FR)

( * ) Notice: Subject to any disclaimer, the term of this patent is extended or adjusted under 35 U.S.C. 154(b) by 816 days.

(21) Appl. No.: 17/073,390

(22) Filed: Oct. 18, 2020

(65) Prior Publication Data
US 2021/0120338 A1 Apr. 22, 2021

(30) Foreign Application Priority Data
Oct. 18, 2019 (FR) ...................................... 19 11697

(51) Int. Cl.
*H04R 3/04* (2006.01)
*B60R 11/02* (2006.01)
*B60R 11/00* (2006.01)

(52) U.S. Cl.
CPC ............ *H04R 3/04* (2013.01); *B60R 11/0217* (2013.01); *B60R 2011/0005* (2013.01);
(Continued)

(58) Field of Classification Search
CPC ...... H04R 7/045; H04R 3/04; H04R 2499/13; B60R 11/0217; B60R 2011/0005;
(Continued)

(56) References Cited

U.S. PATENT DOCUMENTS

| 2002/0159610 A1* | 10/2002 | Bank ...................... | H04R 1/025 381/152 |
| 2003/0221488 A1* | 12/2003 | Goldmeer .............. | G01N 29/46 702/113 |

(Continued)

FOREIGN PATENT DOCUMENTS

| JP | 2004168265 A * | 6/2004 |
| JP | 2004168265 A | 6/2004 |
| WO | WO2019155650 A1 | 8/2019 |

OTHER PUBLICATIONS

"Distributed Mode Loudspeaker", Wikipedia.org, noted on FR search report as XP055183323, dated Jan. 26, 2012, retrieved from the Internet on Oct. 16, 2020 at https://en.wikipedia.org/w/index.php?title=Distributed_mode_loudspeaker&oldid=473305338, 4 pages.

(Continued)

*Primary Examiner* — Daniel L Murphy
*Assistant Examiner* — Amie M NDure
(74) *Attorney, Agent, or Firm* — Reising Ethington P.C.

(57) ABSTRACT

A method for processing an electrical signal for an acoustic emission system. The method carried out by the system includes the following steps: a) transmitting a calibration signal to the electroacoustic transducer; b) emitting a sound based on the calibration signal, by the electroacoustic transducer; c) measuring the voltage across the terminals of the load; d) calculating the variation in impedances of the electroacoustic transducer as a function of the variation in frequencies of the calibration signal; e) determining the resonant frequency of the electroacoustic transducer from the variation in calculated impedances; f) selecting a set of acoustic filters in the database based on the determined resonant frequency; and g) applying the set of acoustic filters to the electrical signal in order to process the electrical signal coming from the input.

11 Claims, 4 Drawing Sheets

(52) U.S. Cl.
CPC ............... *B60R 2011/0021* (2013.01); *B60R 2011/0022* (2013.01); *B60R 2011/0028* (2013.01)

(58) Field of Classification Search
CPC ..... B60R 2011/0021; B60R 2011/0022; B60R 2011/0028; H04S 7/307
See application file for complete search history.

(56) References Cited

U.S. PATENT DOCUMENTS

| | | | | |
|---|---|---|---|---|
| 2004/0100150 | A1* | 5/2004 | Bolz | H03K 17/162 307/116 |
| 2007/0261911 | A1* | 11/2007 | Nichols | H04R 1/2826 181/150 |
| 2008/0156600 | A1* | 7/2008 | Eastham | F16D 65/06 164/113 |
| 2009/0175484 | A1 | 7/2009 | Saint Vincent et al. | |
| 2013/0129101 | A1* | 5/2013 | Tashev | H04R 3/005 381/66 |
| 2015/0304772 | A1* | 10/2015 | Risberg | H04R 3/007 381/55 |

OTHER PUBLICATIONS

"Distributed Mode Loudspeaker", Wikipedia.org, dated Jul. 30, 2020, retrieved from the Internet on Oct. 16, 2020 at https://en.wikipedia.org/wiki/Distributed_mode_loudspeaker, 3 pages.

French Search Report corresponding to French Application No. FR 1911697, dated Jun. 22, 2020, 2 pages.

Written Opinion corresponding to French Application No. FR 1911697, dated Oct. 18, 2019, 6 pages.

* cited by examiner

METHOD FOR PROCESSING A SIGNAL FROM AN ACOUSTIC EMISSION SYSTEM OF A VEHICLE AND VEHICLE COMPRISING THIS ACOUSTIC EMISSION SYSTEM

TECHNICAL FIELD

The invention relates to a method for processing an electrical signal for a vehicle acoustic system comprising sound exciters.

BACKGROUND

Sound exciters are also called exciters. They are attached to supports that they cause to vibrate in order to produce and transmit sound. The use of sound exciters in a vehicle reduces the production cost of the vehicle and the weight of the vehicle. In a vehicle, the supports used may be for example the door panels, the dashboard, or the interior lining (also called "headliner") covering the ceiling of the vehicle. These supports are often made of polypropylene. However, the rigidity of polypropylene varies according to many parameters, for example such as temperature, humidity, aging, panel thickness, and/or any defects or irregularities generated during molding. As a result, the sounds generated by the supports of the vehicle have different sound characteristics depending on the temperature, or different sound characteristics from one vehicle to another at the same temperature. Car manufacturers thus cannot ensure consistent sound quality.

SUMMARY

An object of the present invention is to overcome the above-noted disadvantage.

The invention relates to a method for processing an electrical signal for an acoustic emission system, in particular an acoustic system of a vehicle, the acoustic system comprising: a generator having an input suitable for receiving an electrical signal to be played, at least one electroacoustic transducer connected to the generator, a load having a predetermined impedance, a database containing sets of acoustic filters, a computer connected to the generator and to the database, said electroacoustic transducer comprising a support and a sound exciter fixed on said support and suitable for causing it to vibrate in order to generate audio sounds, said electroacoustic transducer having a resonant frequency which is intrinsic, each set of acoustic filters having been established, during a preliminary step, for a resonant frequency of the electroacoustic transducer, the method comprising the following steps applied to each electroacoustic transducer:

a) transmitting a calibration signal to the electroacoustic transducer, said calibration signal having a frequency which varies within a band of predefined frequencies,
b) emitting a sound based on the calibration signal, by the electroacoustic transducer;
c) measuring the voltage across the terminals of the load during the emission of sound by the electroacoustic transducer,
d) calculating the variation in impedances of the electroacoustic transducer as a function of the variation in frequencies of the calibration signal,
e) determining the resonant frequency of the electroacoustic transducer from the variation in calculated impedances, the resonant frequency corresponding to the frequency of the calibration signal for which the maximum value of the calculated impedances is determined;
f) selecting a set of acoustic filters in the database based on the determined resonant frequency, said set of acoustic filters comprising amplitudes corrected and/or phases corrected as a function of the resonant frequency,
g) applying said set of acoustic filters to the electrical signal in order to process said electrical signal coming from the input prior to its transmission to said electroacoustic transducer.

According to some particular embodiments, the method may have one or more of the following features:

said method is carried out by an acoustic emission system further comprising a temperature sensor suitable for measuring the temperature in the vehicle, and the processing method further comprises a step of measuring the temperature in the vehicle, the set of acoustic filters further being selected based on the measured temperature during the selection step e).

said method is carried out by an acoustic emission system further comprising a humidity sensor suitable for measuring the humidity in the vehicle, the processing method further comprises a step of measuring the humidity in the vehicle, the set of acoustic filters further being selected during step e) based on the humidity measured in the vehicle.

said method further comprises a step of amplifying the calibration signal.

said method comprises a step of analog-to-digital conversion of the voltage across the terminals of the load.

said method further comprises a step of measuring the voltage across the terminals of the assembly of the load and electroacoustic transducer.

the support has a given dimension and is made of a given material, the frequency band of the calibration signal Sc being predefined during a preliminary step according to the dimensions and the material of the support, by empirical measurements.

said method further comprises a preliminary step of establishing the acoustic filters as a function of the resonant frequency of the electroacoustic transducer, said preliminary step being carried out by empirical measurements.

said method is implemented in a motor vehicle, and steps a) to g) are implemented each time at least one door of the vehicle is unlocked.

The invention also relates to an acoustic emission system, preferably for a vehicle, comprising:

an electroacoustic transducer comprising a support and a sound exciter fixed on said support, said sound exciter being suitable for causing the support to vibrate in order to generate audio sounds, said electroacoustic transducer having a resonant frequency which is intrinsic, an electrical signal generator connected to the electroacoustic transducer, the generator being suitable for transmitting a calibration signal to the electroacoustic transducer, the calibration signal having a frequency which varies within a predefined frequency band, a load having a predetermined impedance, connected between the generator and the electroacoustic transducer, a first voltage measuring device suitable for measuring the voltage across the terminals of the load as a function of the frequency of the calibration signal, a second voltage measuring device suitable for measuring the voltage across the terminals of the assembly of said load and of said electroacoustic transducer as a function of the frequency of the calibration signal, a database containing acoustic filters, said acoustic filters being corrected in amplitude and/or in phase as a function of each resonant frequency, each acoustic filter being specific to a given resonant frequency of the electroacoustic transducer, a computer suitable for determining the resonant frequency of the electroacoustic transducer from the calibration signal and from the voltages measured respectively by said first measuring device and said second measuring device, said computer being suitable for choosing a set of acoustic filters from the database as a function of the determined resonant frequency.

The invention also relates to a vehicle comprising an acoustic emission system as described above, wherein the support comprises at least one element among an interior door trim panel, a dashboard, a headliner, and a side pillar.

DETAILED DESCRIPTION

Figure 1:
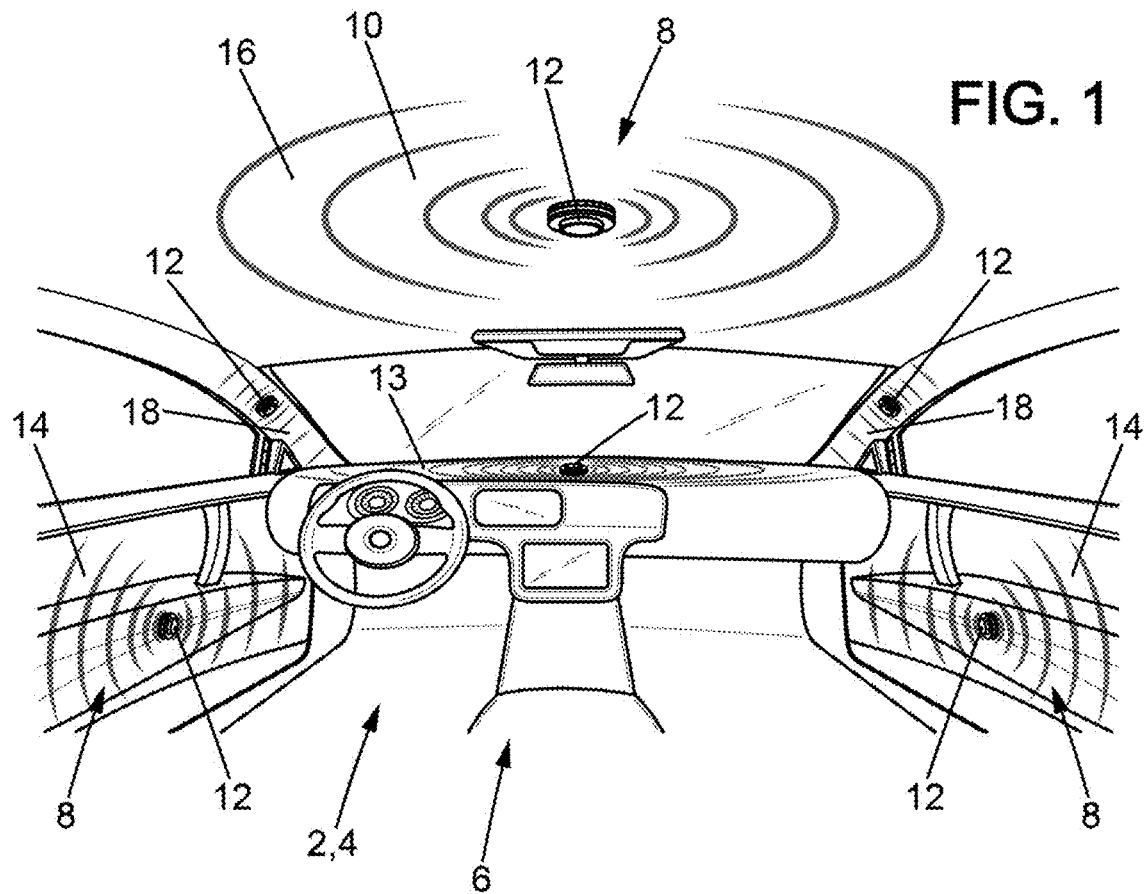
FIG. 1 is a front view of part of a passenger compartment of a vehicle containing an acoustic system according to an embodiment of the present invention.

Referring to FIG. 1, the vehicle 2 according to an embodiment of the present invention comprises a body defining a passenger compartment 4, and an acoustic emission system 6 arranged in the vehicle and suitable for delivering sounds inside the passenger compartment.

The acoustic emission system 6 illustrated in FIG. 1 comprises eight electroacoustic transducers 8. Each electroacoustic transducer 8 comprises a support 10 and a sound exciter 12 mounted on this support. The supports 10 are formed by interior trim of the passenger compartment. Thus, in the example illustrated in FIG. 1, the supports 10 are constituted by the dashboard 13, interior door trim panels 14, a flexible headliner 16 covering the ceiling, and panels 18 covering the side pillars of the compartment.

Figure 2:
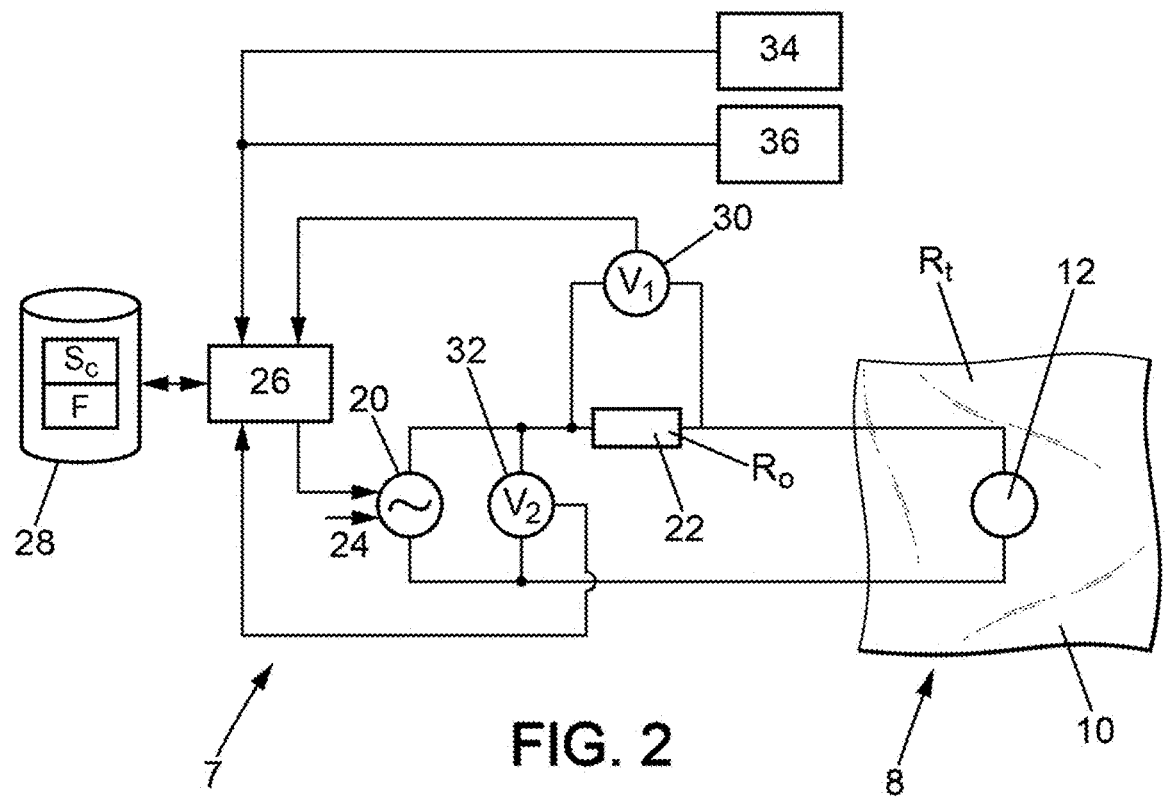
FIG. 2 is a diagram representing an acoustic system according to an embodiment of the invention, suitable for being placed in a vehicle.

To simplify the figures and the description, FIG. 2 schematically represents an acoustic emission system 7 having a single sound exciter 12 fixed on a support 10. However, the invention is applicable to an acoustic emission system comprising several sound exciters 12 fixed on different supports. Similarly, the processing method applies to an acoustic emission system comprising several sound exciters 12 fixed on different supports.

With reference to FIG. 2, the acoustic emission system 7 therefore comprises an electroacoustic transducer 8, an electrical signal generator 20 connected to the electroacoustic transducer 8, and a load 22 having a predetermined impedance connected between the generator 20 and the electroacoustic transducer 8. The electroacoustic transducer 8 comprises a support 10 and a sound exciter 12 fixed on the support 10 and able to cause it to vibrate.

Preferably, the generator 20 of the acoustic emission system is the generator generally used for listening to the radio or to music in the passenger compartment. For this purpose, the generator 20 has an input 24 suitable for receiving an electrical signal intended to be played within the passenger compartment. This electrical signal may be a radio signal captured by an antenna or a signal which comes from reading a recording medium. This generator 20 will be used for a short time to implement the processing method. When the processing method is completed, the generator 20 is used in a conventional manner.

According to a less advantageous variant, the generator 20 is a generator dedicated solely to implementing the processing method.

The load 22 is, for example, a resistor having a known impedance $R_0$.

The acoustic emission system 7 further comprises a database 28 and a computer 26 electrically connected to the generator 20 and to the database 28. Finally, the acoustic emission system 7 comprises a first device 30 for measuring the voltage across the terminals of the load 22 and a second device 32 for measuring the voltage across the terminals of the assembly of the load 22 and of the electroacoustic transducer 8. The first device 30 and second device 32 are suitable for transmitting voltage values $V_1$, $V_2$ to the computer 26. The first device 30 and the second device 32 are, for example, voltmeters.

The computer 26 is suitable for testing the instantaneous vibratory properties of the electroacoustic transducer 8. In particular, the computer 26 is suitable for choosing a calibration signal $S_c$ in the database 28. The calibration signal $S_c$ has been predefined as a function of the transducer electroacoustic 8 to be tested. The computer 26 is suitable for transmitting this calibration signal $S_c$ to the generator 20. The generator 20 is suitable for transmitting this calibration signal $S_c$ on the outputs which are connected to the electroacoustic transducer 8 to be tested.

The computer 26 is able to calculate an impedance value $R_t$ of the electroacoustic transducer 8 for each frequency value of the calibration signal, from the voltage values $V_1$, $V_2$ measured over time by the first device 30 and the second device 32 and from the formula below:

$$R_t = (V_2 - V_1) / \left(\frac{V_1}{R_o}\right)$$

The computer 26 is able to deduce from this the variation in impedance of the electroacoustic transducer 8 as a function of the variation in frequencies. Finally, the computer 26 is able to choose a set of acoustic filters F based on the determined resonant frequency and to transmit this to the generator 20 so that the generator adapts the electrical signal emitted to this electroacoustic transducer 8 as a function of the instantaneous vibratory properties of the electroacoustic transducer 8. Each set of acoustic filters comprises 3 to 20 acoustic filters, and preferably 5 to 15 acoustic filters.

The database 28 comprises the calibration signal $S_c$ and sets of acoustic filters F suitable for selection by the computer and for transmission to the generator 20.

The calibration signal is a signal of the type $S_c=A \sin(wt+\varphi)$. This calibration signal $S_c$ was established to enable finding the instantaneous resonant frequency of the electroacoustic transducer 8. For this purpose, the calibration signal $S_c$ is monotonic, in other words it has a single frequency which varies over time within a predefined frequency range with respect to the support 10. The frequency range depends on the material, the size, and the rigidity of the support. The frequency range is predefined using empirical measurements. Typically, a frequency range containing low frequencies is used when the support extends over a large area such as the ceiling headliner or the dashboard. For example, a frequency range comprising frequencies from 10 Hertz to 1 Kilohertz may advantageously be used for large areas. A frequency range containing high frequencies may be used when the support extends over a small area such as the side pillars of the compartment. For example, a frequency range comprising frequencies from 1 Kilohertz to 7 Kilohertz may advantageously be used for small areas.

The characteristics of the sounds emitted by the support 10 vary with the temperature and humidity in the passenger compartment, the aging of the support 10, as well as any defects in the support 10 or incidental variations in the thickness of the support 10. In particular, the resonant frequency $F_R$ of the electroacoustic transducer 8 varies as a function of these parameters. The sets of acoustic filters F have been established beforehand by empirical measurements in order to correct the variations in the vibratory properties of the support related to weather changes, to the aging of the support 10, and to any defects in the support 10. Thus, each set of acoustic filters F has amplitudes and/or phases modified according to the frequencies. The sets of acoustic filters F are different from each other. Each set of acoustic filters F is adapted to a particular resonant frequency $F_R$ of the electroacoustic transducer 8. The sets of acoustic filters F have been established so that the sound perceived by the occupants of the vehicle is consistent over time and regardless of the weather conditions, as well as consistent from one vehicle to another.

The sets of acoustic filters F are suitable for selection by the computer 26 based on the resonant frequency $F_R$ of the electroacoustic transducer 8 when the support 10 is subjected to the calibration signal. The generator 20 processes the electrical signal using a set of acoustic filters F, before its emission by the electroacoustic transducer 8, in order to correct the sounds emitted during the vibration of the support 10. The correction makes it possible to attenuate or amplify sounds at certain frequencies to compensate for changes in the vibratory properties of the support related to variations in temperature and humidity as well as to aging and to any defects or variations in thickness of the support.

The acoustic emission system 7 may include a temperature sensor 34 suitable for measuring the temperature in the passenger compartment 4 and for transmitting this to the computer 26. When the acoustic emission system 7 comprises a temperature sensor, the sets of filters acoustic F are selected based on the resonant frequency $F_R$ and the temperature inside the passenger compartment. The acoustic emission system 7 may also include a humidity sensor 36 suitable for measuring the humidity in the passenger compartment 4 and for transmitting this to the computer 26. When the acoustic emission system 7 comprises a humidity sensor, the sets of acoustic filters F are selected based on the resonant frequency $F_R$ and the humidity inside the passenger compartment.

Alternatively, the sets of acoustic filters F are selected based on the resonant frequency, the temperature and the humidity inside the passenger compartment. Preferably, the temperature sensor and/or the humidity sensor of the vehicle's air conditioning system supply the temperature and humidity values to the computer 26.

When an acoustic emission system comprises several electroacoustic transducers 8, these are connected in parallel to several outputs of the electrical signal generator 20. For each electroacoustic transducer 8, the acoustic emission system comprises a load 22 having a known impedance, and at least a first device 30 for measuring the voltage across the terminals of this load. Likewise, for each electroacoustic transducer 8, the database 28 comprises a calibration signal $S_c$ established as a function of the support of the electroacoustic transducer 8, and several sets of acoustic filters defined previously for this electroacoustic transducer 8.

Figure 3:
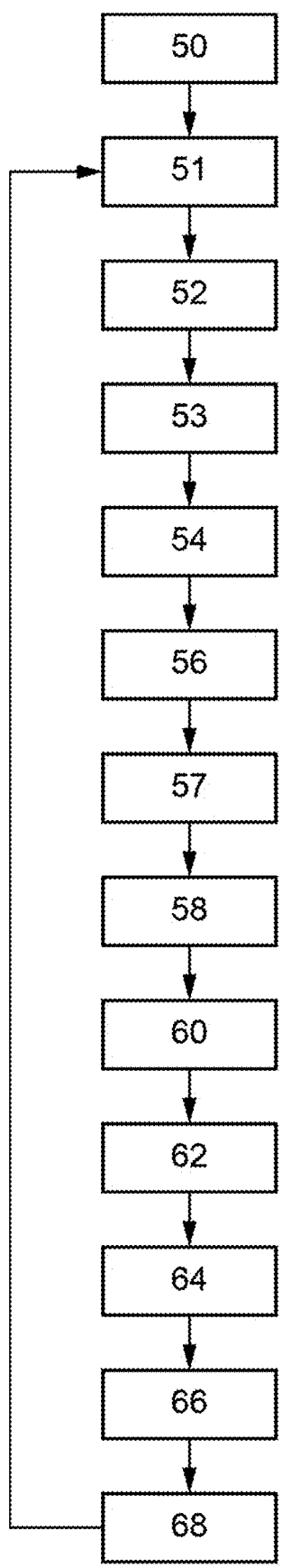
FIG. 3 is a flowchart representing the steps of the processing method implemented by the acoustic system illustrated in FIG. 2.

The method for processing an electrical signal is described as implemented in an acoustic emission system comprising several electroacoustic transducers 8. With reference to FIG. 3, the processing method begins with a preliminary step 50 during which a calibration signal $S_c$ and sets of acoustic filters F are pre-established by operators for each support 10 of the acoustic emission system, based on empirical measurements. During these measurements, the variations in the sounds emitted by each support are measured in particular as a function of the temperature, humidity, and age of the support. The sets of acoustic filters F and the calibration signal $S_c$ defined for each support 10 are recorded in the database 28.

The processing method may be triggered either by a specific command from the driver via a command to the computer 26 or each time the driver performs a predefined action, for example each time he unlocks a door of the vehicle. In the latter case, the processing method begins with a step of detecting the predefined action.

The method for processing electrical signals begins with a step 51 of selecting an electroacoustic transducer 12 to be tested.

During a step 52, the computer 26 selects a calibration signal $S_c$. The calibration signal $S_c$ is defined for the electroacoustic transducer 8 selected during step 51.

Then, during a step 53, the computer 26 transmits the calibration signal $S_c$ to the generator 20. The generator 20 transmits it to the electroacoustic transducer 8 selected during step 51.

During a step 54, the electroacoustic transducer 8 emits a sound in the passenger compartment based on the calibration signal $S_c$.

During a step 56, the first measuring device 30 measures the variation of the voltage $V_1$ across the terminals of the load 22 during the emission of the calibration signal $S_c$.

During a step 57, the second measuring device 32 measures the variation in voltage $V_2$ across the terminals of the assembly of the load 22 and electroacoustic transducer 8 during emission of the calibration signal $S_c$, said outputs being the outputs connected to the electroacoustic transducer concerned.

During a step 58, the support 10 of the electroacoustic transducer 8 emits an acoustic signal in the vehicle, corresponding to the calibration signal.

Figure 4:
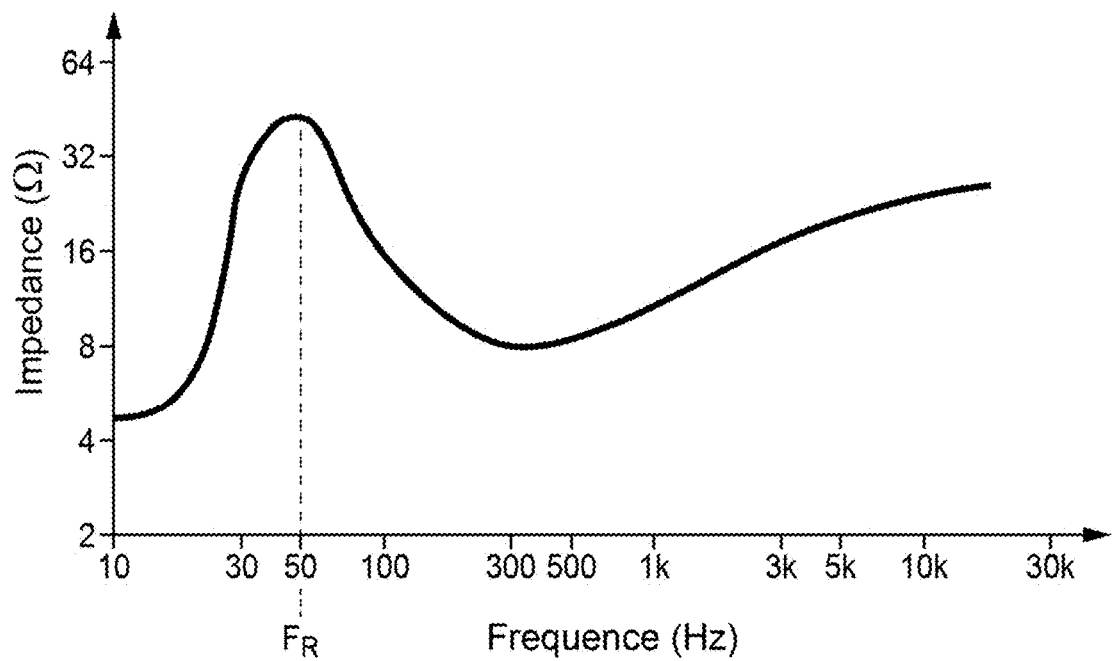
FIG. 4 is a graph showing an impedance across the terminals of the load as a function of the frequency of the signal passing through the load.

During a step 60, the computer 26 calculates the variation in impedance $R_t(f)$ of the electroacoustic transducer 8 as a function of the frequency based on the variation in voltage across the terminals of the load 22 and on the variation in voltage of the assembly of the load 22 and electroacoustic transducer 8. The variation in impedance of the electroacoustic transducer 8 is calculated as a function of the frequency of the calibration signal $S_c$. FIG. 4 illustrates an example curve of the variation in impedance $R_t$ (f) of the electroacoustic transducer 8 as a function of the frequency of the calibration signal.

During a step 62, the computer 26 determines the resonant frequency of the electroacoustic transducer 8 from the variation in impedance calculated during step 60. This resonant frequency corresponds to the maximum impedance of the curve. For example, in FIG. 4 the resonant frequency FR is approximately equal to 50 Hertz.

Then, during a step 64, the computer 26 selects a set of acoustic filters F in the database 28 based on the determined resonant frequency $F_R$.

During a step 66, the computer 26 transmits the set of acoustic filters F to the generator 20.

During a step 68, the generator 20 applies the set of acoustic filters F only to the signal transmitted to the electroacoustic transducer to be processed 12.

When the acoustic system comprises several electroacoustic transducers 8, steps 51 to 68 are then repeated for each electroacoustic transducer of the system.

According to a first variant of the processing method, the temperature sensor 34 measures the temperature inside the passenger compartment of the vehicle and, during step 64, the computer 26 selects the set of acoustic filters F based on both the resonant frequency $F_R$ and the temperature measured inside the passenger compartment.

According to a second variant of the processing method, the humidity sensor 36 measures the humidity inside the passenger compartment of the vehicle and, during step 64, the computer 26 selects the set of acoustic filters F based on both the resonant frequency $F_R$ and the humidity measured inside the passenger compartment.

According to a third variant, the computer 26 selects the set of acoustic filters based on the resonant frequency $F_R$, the temperature and the humidity inside the passenger compartment.

According to one variant, the method does not include a step 57 of measuring the voltage of the assembly of the load 22 and electroacoustic transducer 8. The voltage of the assembly of the load 22 and electroacoustic transducer 8 is considered to be equal to the amplitude of the calibration signal $S_c$. This variant is less precise.

Figure 5:
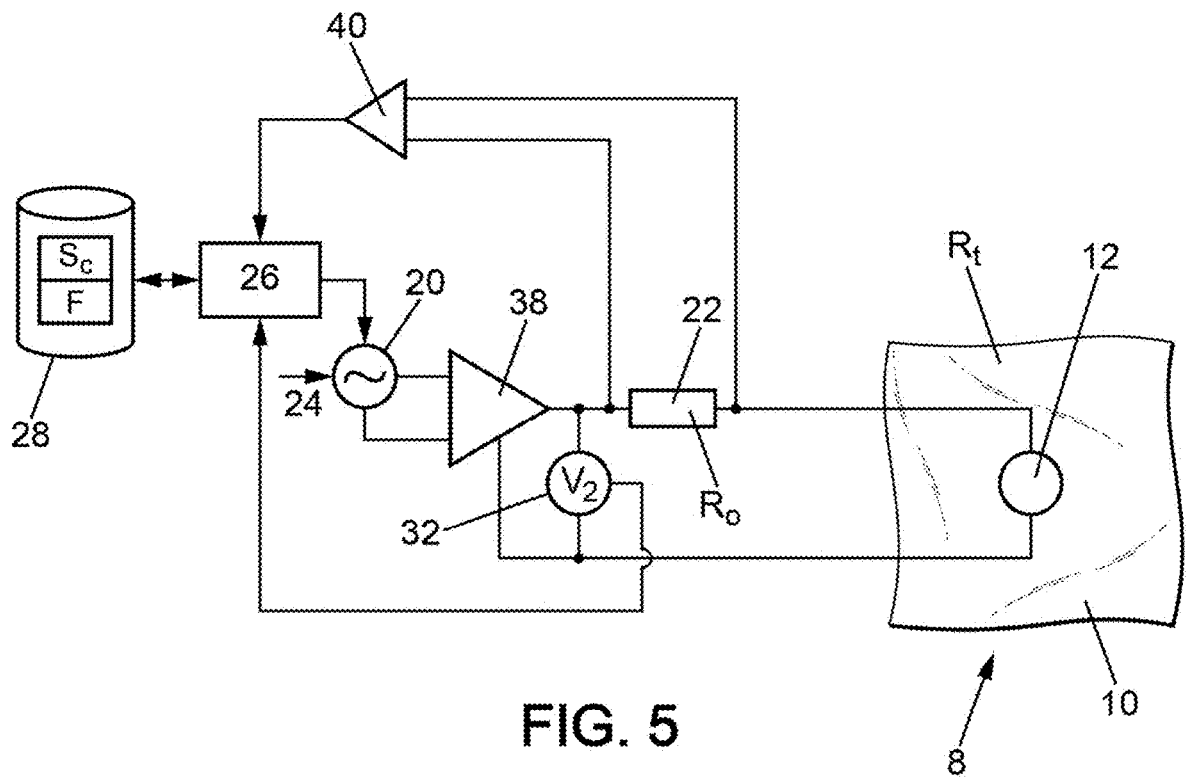
FIG. 5 is a diagram showing an acoustic system according to an alternative embodiment, suitable for being placed in a vehicle.

With reference to FIG. 5, the acoustic emission system 42 illustrated in FIG. 5 is identical to the acoustic emission system illustrated in FIG. 2 except for the fact that it further comprises an amplifier 38 and an analog-to-digital converter 40. The amplifier 38 is connected to the outputs of the generator 20, to the load 22, and to the electroacoustic transducer 8. The input of the analog-to-digital converter 40 is connected to the terminals of the load 22 and its output to the computer 26.

Figure 6:
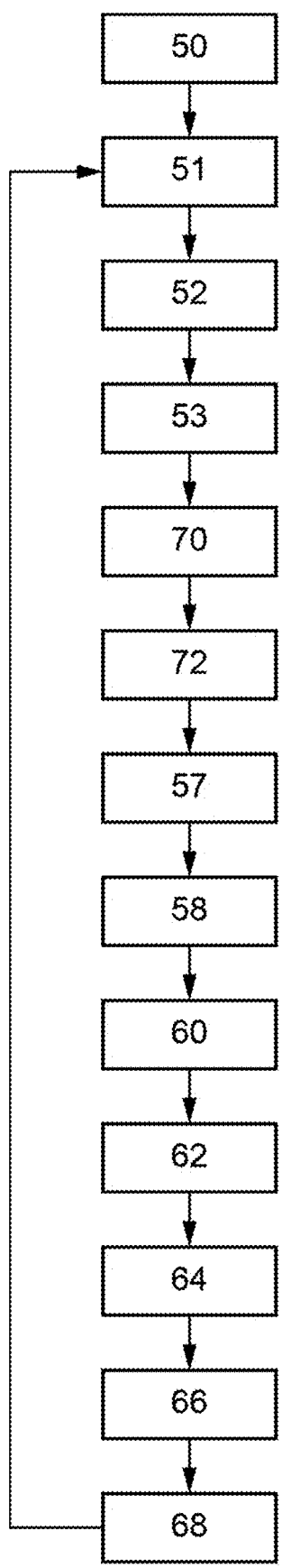
FIG. 6 is a flowchart representing the steps of the processing method implemented by the acoustic system illustrated in FIG. 5.

The processing method implemented in the acoustic emission system 42 illustrated in FIG. 5 is similar to the processing method implemented in the acoustic emission system 7 illustrated in FIG. 2 except for the fact that steps 54 and 56 are replaced by steps 70 and 72, as can be seen in FIG. 6.

During step 70, the calibration signal $S_c$ is amplified by the amplifier 38. Then, the amplified calibration signal is transmitted to the electroacoustic transducer 8 which emits a corresponding sound.

During step 72, the analog-to-digital converter 40 receives the values of the voltage across the terminals of the load 22 during emission of the calibration signal $S_c$. The analog-to-digital converter 40 converts these analog values into digital values which it transmits to the computer 26.

The invention claimed is:

1. A method for processing an electrical signal in an acoustic emission system of a vehicle, the acoustic system comprising a generator having an input suitable for receiving an electrical signal to be played, at least one electroacoustic transducer connected to the generator, a load having a predetermined impedance, a first measuring device, a second measuring device, a database containing sets of acoustic filters, a computer connected to the generator and to the database, said electroacoustic transducer comprising a support and a sound exciter fixed on said support and suitable for causing it to vibrate in order to generate audio sounds, the support comprising at least one element among an interior door trim panel, a dashboard and a side pillar, said electroacoustic transducer having a resonant frequency which is intrinsic, each set of acoustic filters having been established, during a preliminary step, for a resonant frequency of the electroacoustic transducer, the method comprising carrying out the following steps for each electroacoustic transducer:
   a) transmitting a calibration signal to the electroacoustic transducer, said calibration signal having a frequency which varies within a band of predefined frequencies,
   b) emitting a sound based on the calibration signal, by the electroacoustic transducer;
   c1) measuring the voltage across the terminals of the load during the emission of sound by the electroacoustic transducer,
   c2) measuring the variation of the voltage ($V_1$) across the terminals of the load during the emission of the sound corresponding to the calibration signal by the first measuring device,
   c3) measuring the variation in voltage ($V_2$) across the terminals of the assembly of the load and the electroacoustic transducer during emission of the sound corresponding to the calibration signal by the second measuring device,
   d) calculating the variation in impedances of the electroacoustic transducer as a function of the variation in frequencies of the calibration signal based on the variation in voltage across the terminals of the load and on the variation in voltage of the assembly of the load and electroacoustic transducer, and from the formula below:

$$R_t(f)=(V_2(f)-V_1(f))/(V_1(f)/R_0),$$

$R_0$ being the impedance of the load,
   e) determining the resonant frequency of the electroacoustic transducer from the variation in calculated impedances, the resonant frequency corresponding to the frequency of the calibration signal for which the maximum value of the calculated impedances is determined;
   f) selecting a set of acoustic filters in the database based on the determined resonant frequency, said set of acoustic filters comprising amplitudes corrected and/or phases corrected as a function of the resonant frequency,
   g) applying said set of acoustic filters to the electrical signal in order to process said electrical signal coming from the input prior to its transmission to said electroacoustic transducer.

2. The method according to claim 1, carried out by the acoustic emission system which further comprises a temperature sensor suitable for measuring the temperature in the vehicle, wherein the method further comprises a step of measuring the temperature in the vehicle, the set of acoustic filters further being selected based on the temperature measured during the selection step e).

3. The method according to claim 1, carried out by the acoustic emission system which further comprises a humidity sensor suitable for measuring the humidity in the vehicle, the method further comprising a step of measuring the humidity in the vehicle, the set of acoustic filters further being selected during step e) based on the humidity measured in the vehicle.

4. The method according to claim 1, further comprising a step of amplifying the calibration signal.

5. The method according to claim 1, comprising a step of analog-to-digital conversion of the voltage across the terminals of the load.

6. The method according to claim 1, further comprising a step of measuring the voltage across the terminals of the assembly of the load and electroacoustic transducer.

7. The method according to claim 1, wherein the support has a given dimension and is made of a given material, the frequency band of the calibration signal being predefined during a preliminary step according to the dimensions and the material of the support, by empirical measurements.

8. The method according to claim 1, further comprising a preliminary step of establishing the acoustic filters as a function of the resonant frequency of the electroacoustic transducer, said preliminary step being carried out by empirical measurements.

9. The method according to claim 1, implemented in a motor vehicle, wherein steps a) through g) are implemented each time at least one door of the vehicle is unlocked.

10. An acoustic emission system for a vehicle, comprising:
- an electroacoustic transducer comprising a support and a sound exciter fixed on said support, said sound exciter being suitable for causing the support to vibrate in order to generate audio sounds, the support comprising at least one element among an interior door trim panel, a dashboard and a side pillar, said electroacoustic transducer having a resonant frequency which is intrinsic,
- an electrical signal generator connected to the electroacoustic transducer, the generator being suitable for transmitting a calibration signal to the electroacoustic transducer, the calibration signal having a frequency which varies within a predefined frequency band,
- a load having a predetermined impedance, connected between the generator and the electroacoustic transducer,
- a first voltage measuring device suitable for measuring the voltage ($V_1$) across the terminals of the load during emission of the sound corresponding to the calibration signal as a function of the frequency of the calibration signal,
- a second voltage measuring device suitable for measuring the voltage ($V_2$) across the terminals of the assembly of said load and of said electroacoustic transducer during emission of the sound corresponding to the calibration signal as a function of the frequency of the calibration signal,
- a database containing acoustic filters, said acoustic filters being corrected in amplitude and/or in phase as a function of each resonant frequency, each acoustic filter being specific to a given resonant frequency of the electroacoustic transducer,
- a computer suitable for determining the resonant frequency of the electroacoustic transducer from the calibration signal and from the voltages measured respectively by said first measuring device and said second measuring device, based on the variation in voltage across the terminals of the load and on the variation in voltage of the assembly of the load and the electroacoustic transducer, and from the formula below:

$$R_t(f)=(V_2(f)-V_1(f))/(V_1(f)/R_0),$$

$R_0$ being the impedance of the load, said computer being suitable for choosing a set of acoustic filters from the database as a function of the determined resonant frequency.

11. A method for processing an electrical signal for an acoustic emission system, of a vehicle, the acoustic system comprising a generator having an input suitable for receiving an electrical signal to be played, at least one electroacoustic transducer connected to the generator, a load having a predetermined impedance, a first measuring device, a second measuring device, a database containing sets of acoustic filters, a computer connected to the generator and to the database, said electroacoustic transducer comprising a support and a sound exciter fixed on said support and suitable for causing it to vibrate in order to generate audio sounds, the support comprising at least one element among an interior door trim panel, a dashboard and a side pillar, said electroacoustic transducer having a resonant frequency which is intrinsic, each set of acoustic filters having been established, during a preliminary step, for a resonant frequency of the electroacoustic transducer, the method comprising carrying out the following steps for each electroacoustic transducer:

a0) a preliminary step of establishing the acoustic filters as a function of the resonant frequency of the electroacoustic transducer, said preliminary step being carried out by empirical measurements;

a1) transmitting a calibration signal to the electroacoustic transducer, said calibration signal having a frequency which varies within a band of predefined frequencies, b) emitting a sound based on the calibration signal, by the electroacoustic transducer;

c1) measuring the voltage across the terminals of the load during the emission of sound by the electroacoustic transducer, c2) measuring the variation of the voltage ($V_1$) across the terminals of the load during the emission of the sound corresponding to the calibration signal by the first measuring device, c3) measuring the variation in voltage ($V_2$) across the terminals of the assembly of the load and the electroacoustic transducer during emission of the sound corresponding to the calibration signal by the second measuring device, d) calculating the variation in impedances of the electroacoustic transducer as a function of the variation in frequencies of the calibration signal based on the variation in voltage across the terminals of the load and on the variation in voltage of the assembly of the load and electroacoustic transducer, and from the formula below:

$$R_t(f)=(V_2(f)-V_1(f))/(V_1(f)/R_0),$$

$R_0$ being the impedance of the load, e) determining the resonant frequency of the electroacoustic transducer from the variation in calculated impedances, the resonant frequency corresponding to the frequency of the calibration signal for which the maximum value of the calculated impedances is determined;
f) selecting a set of acoustic filters in the database based on the determined resonant frequency, said set of acoustic filters comprising amplitudes corrected and/or phases corrected as a function of the resonant frequency,
g) applying said set of acoustic filters to the electrical signal in order to process said electrical signal coming from the input prior to its transmission to said electroacoustic transducer.

* * * * *